US008837658B2

(12) United States Patent
Chiang

(10) Patent No.: US 8,837,658 B2
(45) Date of Patent: *Sep. 16, 2014

(54) METHOD AND APPARATUS FOR SAMPLING A SERIAL DATA STREAM USING A CLOCK SIGNAL, BASED ON A COUNTER PATTERN

(71) Applicant: Marvell World Trade Ltd., St. Michael (BB)

(72) Inventor: John M. Chiang, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/076,026

(22) Filed: Nov. 8, 2013

(65) Prior Publication Data

US 2014/0064421 A1 Mar. 6, 2014

Related U.S. Application Data

(63) Continuation of application No. 12/877,823, filed on Sep. 8, 2010, now Pat. No. 8,582,707.

(60) Provisional application No. 61/240,958, filed on Sep. 9, 2009.

(51) Int. Cl.
*H04L 7/00* (2006.01)
*H04L 7/08* (2006.01)
*H04L 25/02* (2006.01)
*H04L 7/10* (2006.01)

(52) U.S. Cl.
CPC .............. *H04L 7/08* (2013.01); *H04L 25/0262* (2013.01); *H04L 7/10* (2013.01)
USPC ........... 375/355; 375/316; 375/354; 375/356; 375/365

(58) Field of Classification Search
CPC ....... H04L 7/0008; H04L 7/02; H04L 7/0337; H04L 7/0334; H04L 7/042; G06F 1/10; H04J 3/0685; H04J 3/0608
USPC .................................. 375/316, 354–356, 365
See application file for complete search history.

(56) References Cited

U.S. PATENT DOCUMENTS

| 7,167,532 | B1 * | 1/2007 | Bronfer et al. ................. 375/355 |
| 7,403,582 | B2 | 7/2008 | Akasaka |
| 7,636,410 | B2 | 12/2009 | Vandensande |
| 2006/0222129 | A1 | 10/2006 | Hadzic et al. |
| 2007/0189335 | A1 | 8/2007 | Ritter |

FOREIGN PATENT DOCUMENTS

EP     1158735 A1    11/2001

OTHER PUBLICATIONS

International Searching Authority, "International Search Report," PCT Application No. PCT/US2010/048151, Nov. 17, 2010.

* cited by examiner

*Primary Examiner* — Ted Wang

(57) ABSTRACT

In one embodiment, a method includes determining pre-calculated information. The pre-calculated information is used to determine a counter pattern for a reference clock. The counter pattern include, for at least one data bit, a number of reference clock cycles of the reference clock that is determined based on a frequency of the reference clock and a data rate of a serial data stream. The serial data stream is sampled to read a plurality of data bits based on the counter pattern. A data bit is sampled based on the number of reference clock cycles associated with the data bit.

20 Claims, 6 Drawing Sheets

| BAUD Rates | REFCLK=26(38.46ns per sample) | | REFCLK=38.4 | |
|---|---|---|---|---|
| | center sampling point | Bcounter value (start-dx-stop) | center sampling point | Bcounter value (start-dx-stop) |
| 4.0000 | 3.2500 | 3-6-7-6-7 | 4.8000 | 5-10-10-9 |
| 3.6900 | 3.5230 | 4-7-7-7 | 5.2033 | 5-11-11-10 |
| 3.2500 | 4.0000 | 4-8-8-8 | 5.9077 | 6-12-12-11 |
| 3.0000 | 4.3333 | 4-9-9-8 | 6.4000 | 6-13-13-12 |
| 2.7648 | 4.7020 | 5-9-9-10 | 6.9444 | 7-14-14-14 |

Fig. 5

METHOD AND APPARATUS FOR SAMPLING A SERIAL DATA STREAM USING A CLOCK SIGNAL, BASED ON A COUNTER PATTERN

CROSS REFERENCE TO RELATED APPLICATIONS

The present disclosure is a continuation of and claims priority to U.S. patent application Ser. No. 12/877,823, filed Sep. 8, 2010, now U.S. Pat. No. 8,582,707, issued Nov. 12, 2013, which claims priority to U.S. Provisional Patent Application No. 61/240,958, filed Sep. 9, 2009, which are incorporated herein by reference.

BACKGROUND

Particular embodiments generally relate to a universal asynchronous receiver/transmitter (UART).

Unless otherwise indicated herein, the approaches described in this section are not prior art to the claims in this application and are not admitted to be prior art by inclusion in this section.

A UART may be used for serial communications. A UART transmitter may take bytes of data in a parallel form and transmit individual bits sequentially. A UART receiver reassembles the bits into complete bytes. The UART receiver synchronizes itself at the start of every frame (e.g., a byte of data) to maintain reliable data sampling. FIG. 1 shows a conventional data frame 100. Data frame 100 may include a start bit 102, eight data bits 104, and a stop bit 106. The bits in data frame 100 are sent serially from the UART transmitter to the UART receiver.

The UART receiver uses a UART reference clock to sample the serial data stream that is received. The UART reference clock is typically at a higher frequency, such as 16 times, than a baud rate of the serial data stream.

FIG. 2 shows sampling of the serial data stream. A UART reference clock 202 is provided along with a serial data stream 204. A start bit 102 is recognized at a falling edge shown at 206.

The UART receiver may then reset its counters on this falling edge. The UART receiver counts a number of clock cycles of reference clock 202 such that the serial data stream's bits are sampled mid-bit. For example, if there are 16 clock cycles during the transfer of a bit, then after 8 clock cycles, the start bit may be sampled at 208. The start bit is sampled mid-bit to check that the level is still low to ensure that the detected falling edge was a start bit and not noise. Then, 16 clock cycles thereafter, a first bit D0 is sampled mid-bit. This process continues as each bit is sampled every 16 clock cycles until a stop bit (not shown) is received.

Problems may occur with the UART timing, which may cause data corruption. FIG. 3 shows an example of a receiving range for the serial data stream. It is preferable to sample the data bit at the mid-point because there may be bit transition times. For example, bit transition times are shown at an area 302 where the serial data stream is changing states. It is not desirable to sample the serial data stream in area 302. A data eye 304 is a portion where it is desirable to sample the data bit. As shown, a first limit and a second limit show the limits of sampling in which a correct reading may be determined and also an optimum point 306, which is the mid-point.

For a "nasty" scenario, which only allows sampling within the middle 50% of the bit time, an error budget may be small. For example, the error budget may be +/− four samples for a 16× reference clock or only +/− two samples for 8× reference clock. Thus, to allow larger error budgets, the UART reference clock is designed to be a larger multiple of the desired baud rate. For example, a faster reference clock allows a finer resolution of a time to sample the serial data stream. However, to have the faster UART reference clock, a numerical computation oscillator (NCO) or a fraction divider may be needed to have an accurate reference clock to support the throughput of the baud rate. The NCO circuitry may be very complicated, costly, and include an expensive external crystal or internal phase lock loop (PLL). Additionally, using the higher frequency UART reference clocks consume more power and increase die size.

SUMMARY

In one embodiment, a method includes determining pre-calculated information. The pre-calculated information is used to determine a counter pattern for a reference clock. The counter pattern includes, for at least one data bit, a number of reference clock cycles of the reference clock that is determined based on a frequency of the reference clock and a data rate of a serial data stream. The serial data stream is sampled to read a plurality of data bits based on the counter pattern. A data bit is sampled based on the number of reference clock cycles associated with the data bit.

In one embodiment, the pre-calculated information includes a table that includes the data rate and the counter pattern for the data rate.

In one embodiment, the pre-calculated information includes a function or mapping, the method further comprising computing the counter pattern using the function or mapping, the function or mapping based on the data rate and the frequency of the reference clock.

In one embodiment, an apparatus includes logic configured to determine pre-calculated information. The pre-calculated information is used to determine a counter pattern for a reference clock. The counter pattern includes, for at least one data bit, a number of reference clock cycles of the reference clock that is determined based on a frequency of the reference clock and a data rate of a serial data stream. The logic is configured to sample the serial data stream to read a plurality of data bits based on the counter pattern, wherein a data bit is sampled based on the number of reference clock cycles associated with the data bit.

In one embodiment, the logic is configured to determine the data rate and determine the counter pattern based on the data rate, wherein different data rates are associated with different counter patterns.

In one embodiment, the pre-calculated information includes different data rates and different counter patterns for the different data rates.

In one embodiment, the reference clock is a system reference clock.

The following detailed description and accompanying drawings provide a more detailed understanding of the nature and advantages of the present invention.

BRIEF DESCRIPTION OF THE DRAWINGS

FIG. 5 shows an example of a table that may be used to determine the counter pattern according to one embodiment.

DETAILED DESCRIPTION

Described herein are techniques for a UART. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
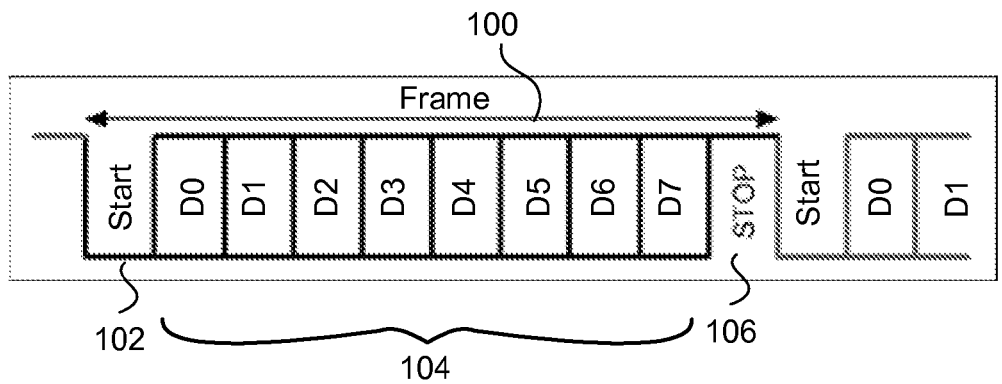
FIG. 1 shows a conventional data frame.
Figure 2:
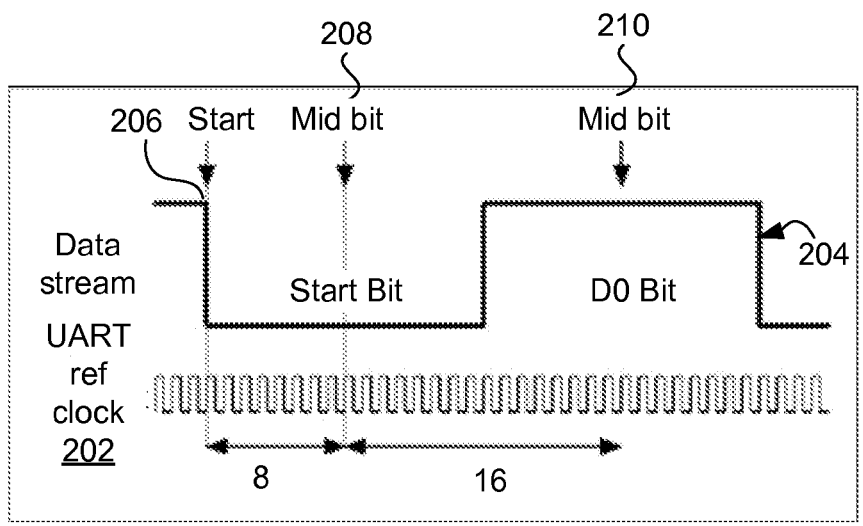
FIG. 2 depicts a method for sampling the serial data stream.
Figure 3:
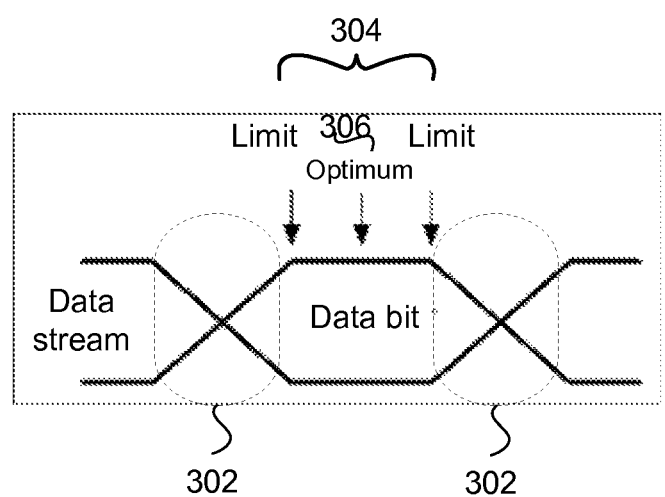
FIG. 3 shows an example of a receiving range for the serial data stream.
Figure 4:
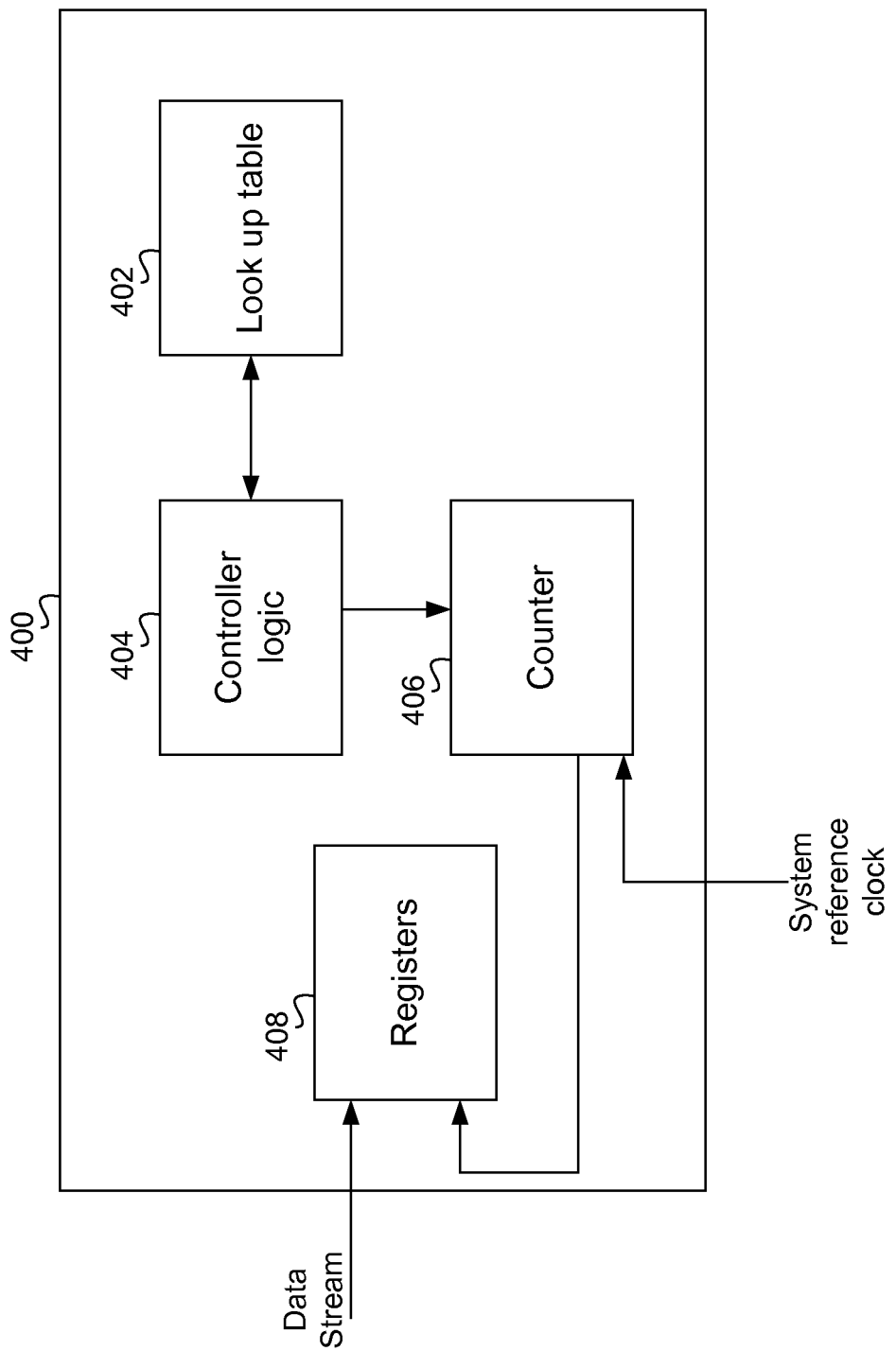
FIG. 4 shows an example of a UART according to one embodiment.

FIG. 4 shows an example of a UART 400 according to one embodiment. Although this implementation is shown, a person skilled in the art may appreciate other implementations based on the teachings and disclosures herein. UART 400 may be included in different systems, such as wireless systems that communicate through Bluetooth, WiFi, or other methods. Particular embodiments use a system clock as the UART reference clock to determine when to sample a serial data stream. The system clock may be a clock used by a system that includes UART 400.

Particular embodiments use pre-calculated counter patterns for the UART reference clock to determine when to sample the data stream. The pre-calculated counter pattern is determined based on a baud rate of the data stream. A baud rate may be the symbols per second or pulses per second. A symbol may be an amount of data, such as a frame of data, or byte of data. If a time of the length of the bit is known, then a distance from a bit transition edge to a center of the bit time may be determined. Counter values for the counter pattern may then be determined for each data bit to determine when to sample the data stream based on the frequency of the reference clock. The counter values may change so the sampling of the data stream is within a portion (e.g., a data eye) in which sampling of the data stream is desired. The use of the counter pattern allows the UART reference clock to use a system reference clock, which may be slower than a conventional high frequency UART reference clock that was used. Also, the system clock may be of varying frequencies because different counter patterns may be calculated for different system clock frequencies and baud rates.

Different counter patterns may be pre-calculated for different baud rates. This information may be stored and accessed by UART 400. For example, a look-up table 402 may store the information for the different counter patterns. However, look-up table 402 might not be used. For example, the information may be stored in software programmable registers or implemented in other logic, such as software programming. Further, the pre-calculated information may be implemented in a function or mapping where the baud rate is used to calculate the counter pattern in real-time.

Controller logic 404 is configured to determine when to sample the data stream. In one example, controller logic 404 uses look-up table 402 or software programmable registers to determine the pre-calculated information for the counter pattern.

Controller logic 404 may determine the baud rate of the data stream. For example, the baud rate is pre-programmed or received as input from a user. Then, the counter pattern is determined.

When the start bit is detected in the data stream, controller logic 404 determines the counter pattern for the baud rate. Controller logic 404 then configures a counter 406 to determine when to sample the data stream. For example, counter 406 is configured such that it overflows when the counter value is reached. If the counter value is 3, then counter 406 is configured to reach an overflow state at 3 reference clock cycles.

When the overflow condition is reached, controller logic 404 for counter 406 clocks a bank of registers 408 to sample the data stream. The bit that is sampled is stored in register 408. For example, a data bit is shifted into a register.

Once the overflow condition is reached, controller logic 404 may configure counter 406 for a new counter value. For example, if the next counter value in the counter pattern is 6, then counter 406 is configured to overflow when 6 reference clock cycles are reached. This process continues as counter 406 is reconfigured with the counter value until the data frame is read (e.g., a stop bit is read).

FIG. 5 shows an example of a table 500 that may be used to determine the counter pattern according to one embodiment. In a column 502, possible baud rates of the serial data stream are shown. In a column 504, information for a reference clock of a first frequency is shown and in a column 506, information for a reference clock of a second frequency is shown. Counter patterns for other reference clocks may also be pre-calculated.

In column 507, a center sampling point is shown. The center sampling point is the number of clock cycles to the mid-point of a data bit. For example, a center sampling point of 3.25 means if the data bit is sampled after 3 clock cycles and ¼ of the fourth clock cycle, this would be the mid-point of the start bit. After the mid-point of the start bit, then every 6.5 clock cycles is the center sampling point of successive data bits. 6.5 bits is used because the start bit is sampled halfway from a transition edge. Double the 3.25 bits is then the mid-point of the next data bit. Because sampling at 6.5 clock cycles might not possible or desired, the counter values are for a number of clock cycles, such as 6 or 7 clock cycles. This may not sample the data bit in the mid-point but may be in the data eye. However, if the sampling were to continue for each data bit, the cumulative error may cause the sampling to occur outside of the data eye. Accordingly, the counter values in the counter patter may vary to compensate for the error and cause the sampling to remain in the data eye. For example, in a column 508, the counter pattern is shown as 3-6-7-6-7. In this case, the mid-point of a start bit is sampled after 3 clock cycles. The first data bit D0 is sampled after 6 additional clock cycles. Then, the second, third, and fourth data bits (D1, D2, and D3) are sampled after 7 clock cycles, 6 clock cycles, and 7 clock cycles, respectively. This pattern may repeat itself until the data frame is sampled. For example, the fifth, sixth, seventh, and eighth data bits may be read after 6, 7, 6, and 7 successive clock cycles. Then, a stop bit is read.

Thus, by varying the counter values in the counter pattern, any error in sampling of the data stream may be corrected. For example, if only 6 reference clock cycles were used, the error would accumulate as each data bit is read and may cause data corruption if a data bit is read on a transition. The same is true if only the counter value of 7 is used. However, by varying the number of counter values in the counter pattern, the error may be compensated for when the center sampling point is not exactly at a reference cycle. If the center sampling point is at the end of a clock cycle, then the counter values may not be varied. For example, for the 3.25 baud rate, the center sampling point is 4 clock cycles. The counter patter is 4-8-8-8 clock cycles in this case. Thus, every 8 clock cycles after the start bit, the data stream is sampled.

Figure 6:
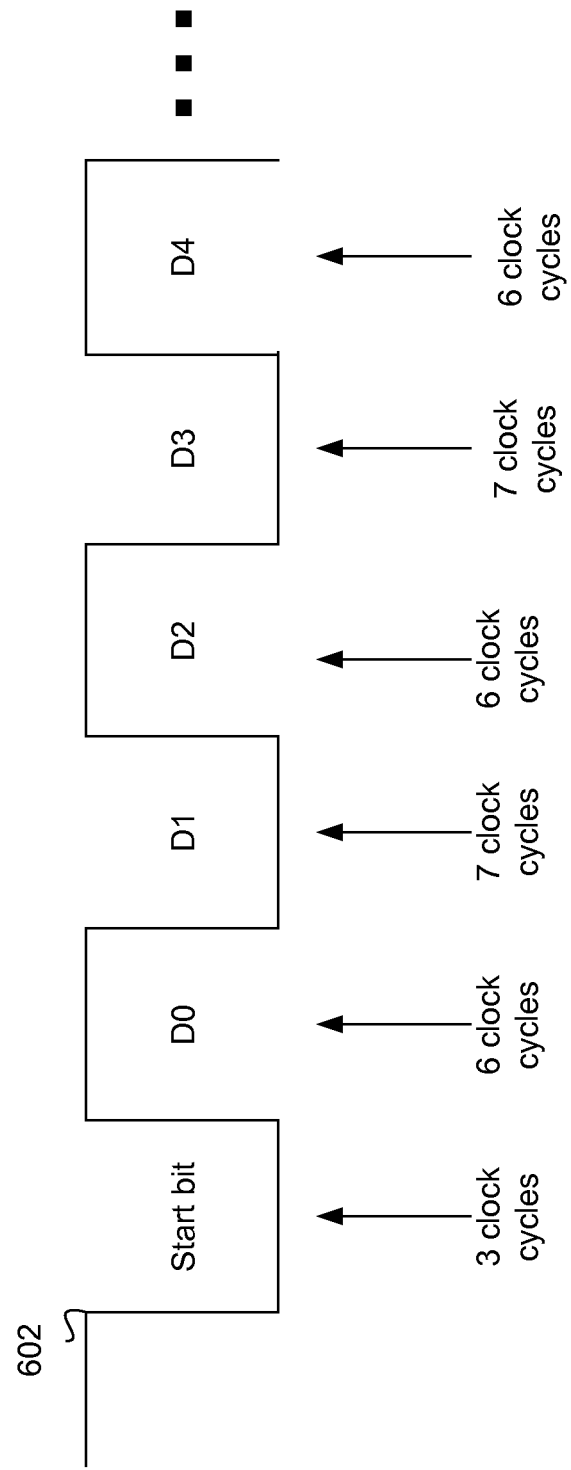
FIG. 6 shows an example of receiving data according to one embodiment.

FIG. 6 shows an example of receiving data according to one embodiment. At 602, a start bit is detected. After 3 reference clock cycles, the start bit may be sampled again to determine if it is really a start bit. Then, after 6 reference clock cycles, the first data bit D0 is sampled. After a further 7 reference clock cycles, a second data bit D1 is sampled. Data bits D2, D3, and D4 are sampled after 6 reference clock cycles, 7 reference clock cycles, and 6 reference clock cycles, respectively. The pattern continues as bits D5, D6, D7, D8, and the stop bit are sampled. The counter values are varied to maintain the sampling point around the mid-point and within an acceptable error budget. This may ensure that data bits are sampled within a data eye and without data corruption.

Figure 7:
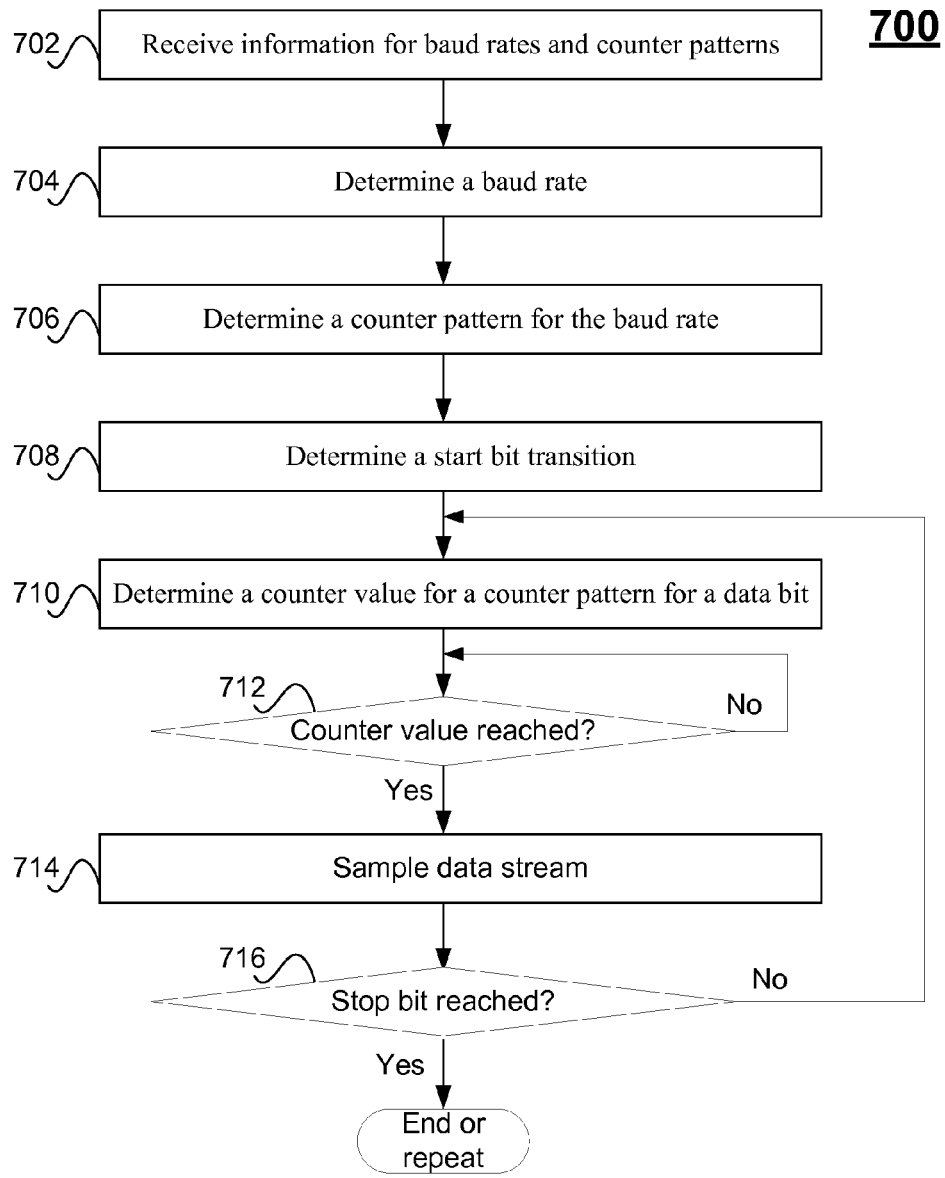
FIG. 7 depicts an example of a flowchart of a method for sampling a data stream according to one embodiment.

FIG. 7 depicts an example of a flowchart 700 of a method for sampling a data stream according to one embodiment. At 702, information for baud rates and counter patterns is received. The information may include different baud rates and different counter patterns for the baud rates. The information is pre-calculated to determine counter values in a counter pattern to sample a data stream, for example, within the data eye. The information may be a look-up table, function, mapping, or programmed software.

At 704, a baud rate is determined. For example, the baud rate is programmed or received from a user. At 706, a counter pattern for the baud rate is determined. The counter pattern may be looked up from table 402 or calculated.

At 708, a start bit transition is determined. At 710, a counter value for a counter pattern is determined for a data bit. For example, the counter value for the start bit or another bit is determined. As described above, counter 406 may be configured such that it will overflow when the counter value is reached.

At 712, it is determined if counter value is reached. If the counter value has not been reached, the count continues. The counter is incremented at every reference clock cycle.

When the counter value is reached, at 714, the data stream is sampled. For example, register 408 is clocked such that a data stream is sampled.

At 716, it is determined if the stop bit has been received. If the stop bit has not been received, the process continues where another counter value in the counter pattern is determined for a next data bit. For example, the counter value of 6 may be determined for the next data bit. The process repeats itself until the stop bit is received. Although a stop bit is described, it may not be necessary to detect a stop bit to determine the end of a frame. Other events or indications may be used to indicate the end of a frame. At this point, the process ends or repeats for another frame or symbol.

Accordingly, system clocks that are available in a system may be used as the UART reference clocks. This may add no extra cost and save power and die size. Thus, a high frequency reference clock does not need to be added to a chip. Also, an NCO, an internal PLL, a fractional divider or an external crystal are not needed.

The system clock may not be the traditional ratio of 16× the baud rate. The lower reference frequency may be used at a high throughput baud rate, which also saves power and die size. The different counter patterns for different frequencies of the sampling points and baud rates may be implemented through software programming, which simplifies the UART design. The counter values are pre-calculated and may be fine tuned through the testing to determine a counter pattern for any type of reference clock. The pre-calculated counter patterns may be stored as a look-up table or as program logic through software loading.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
   receiving a serial data stream;
   determining that the serial data stream has a first data rate;
   determining that a reference clock has a first frequency, wherein the reference clock is to be used to sample the serial data stream;
   based on (i) the first data rate of the serial data stream and (ii) the first frequency of the reference clock, determining, by logic of an apparatus, a counter pattern, wherein the counter pattern has a plurality of numbers; and
   based on the counter pattern, sampling the serial data stream using the reference clock, to read a plurality of data bits included in the data stream, wherein each number of the plurality of numbers of the counter pattern is used for sampling a corresponding data bit of the plurality of data bits included in the data stream.

2. The method of claim 1, wherein each number of the plurality of numbers of the counter pattern is configured to indicate when to sample a corresponding data bit of the plurality of data bits included in the data stream.

3. The method of claim 1, wherein:
   the serial data stream comprises a data frame, wherein the data frame comprises the plurality of data bits, wherein the plurality of data bits comprises (i) a first data bit, (ii) a second data bit, and (iii) a third data bit, wherein the first data bit is a start data bit of the plurality of data bits of the data frame, and wherein the first data bit, the second data bit, and the third data bit are three consecutive data bits of the plurality of data bits of the data frame;
   the plurality of numbers of the counter pattern comprises (i) a first number, (ii) a second number, and (iii) a third number;
   the first number is associated with sampling the first data bit;
   the second number is associated with sampling the second data bit; and
   the third number is associated with sampling the third data bit.

4. The method of claim 3, wherein:
   each of the second number and the third number is different from the first number; and
   the third number is different from the second number.

5. The method of claim 3, wherein sampling the serial data stream comprises:
   detecting a start of the data frame;
   sampling the first data bit when the first number of clock cycles of the reference clock has elapsed since the detection of the start of the data frame;
   sampling the second data bit when the second number of clock cycles of the reference clock has elapsed since sampling the first data bit; and sampling the third data bit when the third number of clock cycles of the reference clock has elapsed since sampling the second data bit.

6. The method of claim 1, wherein the counter pattern is a first counter pattern, and wherein determining the first counter pattern comprises:
accessing a look-up table, wherein the look-up table stores, for each of a plurality of data rates and for each of a plurality of frequencies, a corresponding counter pattern, such that a plurality of counter patterns is stored in the look-up table; and
identifying the first counter pattern from the plurality of counter patterns in the look-up table such that the first counter pattern of the plurality of counter patterns corresponds to (i) the first data rate of the serial data stream and (ii) the first frequency of the reference clock.

7. The method of claim 6, wherein look-up table is programmed in logic of an integrated circuit chip performing the sampling.

8. The method of claim 1, wherein the counter pattern is a first counter pattern, and wherein determining the first counter pattern comprises:
accessing a plurality of counter patterns, wherein each counter pattern of the plurality of counter patterns is associated with (i) a corresponding data rate of the serial data stream and (ii) a corresponding frequency of the reference clock; and
identifying, from the plurality of counter patterns, the first counter pattern such that the first counter pattern of the plurality of counter patterns is associated with (i) the first data rate of the serial data stream and (ii) the first frequency of the reference clock.

9. The method of claim 1, further comprising:
determining a number of reference clock cycles in the counter pattern for a respective data bit of the plurality of data bits of the data stream;
reading a counter;
determining when the number of reference clock cycles is reached based on a value of the counter; and
sampling the serial data stream when the number of reference clock cycles is reached to determine the respective data bit.

10. The method of claim 1, wherein the reference clock comprises a system clock for a system.

11. An apparatus configured to (i) receive a serial data stream, and (ii) sample the data stream, the apparatus comprising:
logic configured to
determine that the serial data stream has a first data rate,
determine that a reference clock has a first frequency, wherein the reference clock is to be used to sample the serial data stream,
based on (i) the first data rate of the serial data stream and (ii) the first frequency of the reference clock, determine a counter pattern, wherein the counter pattern has a plurality of numbers, and
based on the counter pattern, facilitate sampling the serial data stream using the reference clock, to read a plurality of data bits included in the data stream, wherein each number of the plurality of numbers of the counter pattern is used for sampling a corresponding data bit of the plurality of data bits included in the data stream.

12. The apparatus of claim 11, wherein each number of the plurality of numbers of the counter pattern is configured to indicate when to sample a corresponding data bit of the plurality of data bits included in the data stream.

13. The apparatus of claim 11, wherein:
the serial data stream comprises a data frame, wherein the data frame comprises the plurality of data bits, wherein the plurality of data bits comprises (i) a first data bit, (ii) a second data bit, and (iii) a third data bit, wherein the first data bit is a start data bit of the plurality of data bits of the data frame, and wherein the first data bit, the second data bit, and the third data bit are three consecutive data bits of the plurality of data bits of the data frame;
the plurality of numbers of the counter pattern comprises (i) a first number, (ii) a second number, and (iii) a third number;
the first number is associated with sampling the first data bit;
the second number is associated with sampling the second data bit; and
the third number is associated with sampling the third data bit.

14. The apparatus of claim 13, wherein:
each of the second number and the third number is different from the first number; and
the third number is different from the second number.

15. The apparatus of claim 13, wherein the logic is configured to facilitate sampling the serial data stream by facilitating:
detecting a start of the data frame; and
sampling the first data bit when the first number of clock cycles of the reference clock has elapsed since the detection of the start of the data frame.

16. The apparatus of claim 15, wherein the logic is configured to facilitate sampling the serial data stream by facilitating:
sampling the second data bit when the second number of clock cycles of the reference clock has elapsed since sampling the first data bit; and
sampling the third data bit when the third number of clock cycles of the reference clock has elapsed since sampling the second data bit.

17. The apparatus of claim 11, wherein the counter pattern is a first counter pattern, and wherein the apparatus further comprises:
a memory configured to store a look-up table, wherein the look-up table stores, for each of a plurality of data rates and for each of a plurality of frequencies, a corresponding counter pattern, such that a plurality of counter patterns is stored in the look-up table,
wherein the logic is configured to determine the first counter pattern by
identifying the first counter pattern from the plurality of counter patterns in the look-up table such that the first counter pattern of the plurality of counter patterns corresponds to (i) the first data rate of the serial data stream and (ii) the first frequency of the reference clock.

18. The apparatus of claim 11, wherein the counter pattern is a first counter pattern, and wherein the logic is configured to determine the first counter pattern by:
accessing a plurality of counter patterns, wherein each counter pattern of the plurality of counter patterns is associated with (i) a corresponding data rate of the serial data stream and (ii) a corresponding frequency of the reference clock; and
identifying, from the plurality of counter patterns, the first counter pattern such that the first counter pattern of the plurality of counter patterns is associated with (i) the first data rate of the serial data stream and (ii) the first frequency of the reference clock.

19. The apparatus of claim 11, wherein the logic is configured to facilitate sampling the serial data stream by facilitating:
- determining a number of reference clock cycles in the counter pattern for a respective data bit of the plurality of data bits of the data stream;
- reading a counter;
- determining when the number of reference clock cycles is reached based on a value of the counter; and
- sampling the serial data stream when the number of reference clock cycles is reached to determine the respective data bit.

20. The apparatus of claim 11, wherein the reference clock comprises a system clock for a system.

* * * * *